(12) United States Patent
Zeitner et al.

(10) Patent No.: US 8,240,211 B2
(45) Date of Patent: Aug. 14, 2012

(54) ULTRASONIC PROBE AND METHOD FOR THE OPTICAL DETECTION OF ULTRASONIC WAVES

(75) Inventors: Uwe D. Zeitner, Weimar (DE); Sicco I. Schets, Jena (DE); Eliseo V. Sobrino, Jena (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 477 days.

(21) Appl. No.: 12/373,374

(22) PCT Filed: Jul. 18, 2007

(86) PCT No.: PCT/EP2007/006396
§ 371 (c)(1),
(2), (4) Date: Oct. 1, 2009

(87) PCT Pub. No.: WO2008/009442
PCT Pub. Date: Jan. 24, 2008

(65) Prior Publication Data
US 2010/0043561 A1     Feb. 25, 2010

(30) Foreign Application Priority Data

Jul. 18, 2006   (DE) .......................... 10 2006 033 229

(51) Int. Cl.
*G01H 9/00* (2006.01)
(52) U.S. Cl. ................. 73/655; 73/620; 73/643
(58) Field of Classification Search .......... 73/608, 73/620, 643, 646, 656, 657; 356/352, 358; 600/447, 448
See application file for complete search history.

(56) References Cited

U.S. PATENT DOCUMENTS

| | | | |
|---|---|---|---|
| 3,882,718 A | 5/1975 | Kriebel | 73/80 |
| 4,833,928 A | 5/1989 | Luukkala et al. | 73/862.39 |
| 5,894,531 A * | 4/1999 | Alcoz | 385/11 |
| 6,134,006 A * | 10/2000 | Telschow et al. | 356/503 |
| 6,594,290 B2 | 7/2003 | Toida | 372/28 |
| 6,609,425 B2 | 8/2003 | Ogawa | 73/608 |
| 6,881,189 B2 | 4/2005 | Ogawa | 600/459 |
| 6,901,176 B2 | 5/2005 | Balachandran et al. | 385/12 |
| 6,958,817 B1 * | 10/2005 | Zhu et al. | 356/498 |
| 7,116,426 B2 * | 10/2006 | Lal et al. | 356/486 |
| 7,590,312 B2 * | 9/2009 | Mizuno et al. | 385/1 |
| 7,667,851 B2 * | 2/2010 | Dubois et al. | 356/502 |

(Continued)

FOREIGN PATENT DOCUMENTS

CH   674 262 A5   5/1990

(Continued)

OTHER PUBLICATIONS

Hlubina, Peter, Measuring Distances and Displacements Using Dispersive White-Light Spectral Interferometry, Proceedings of SPIE, 2003, pp. 628-636, vol. 5144.

(Continued)

*Primary Examiner* — J M Saint Surin
(74) *Attorney, Agent, or Firm* — Brinks Hofer Gilson & Lione (57) ABSTRACT

An ultrasonic probe for optical detection of ultrasonic waves includes a membrane integrated into the probe for contact with a body, the membrane being excited to vibration by reflected ultrasonic waves, leading to a change in optical path length of a beam of light directed at the membrane, which change is determined interferometrically.

37 Claims, 5 Drawing Sheets

U.S. PATENT DOCUMENTS

| | | | |
|---|---|---|---|
| 7,782,467 B2 * | 8/2010 | Chappel | 356/511 |
| 8,004,689 B2 * | 8/2011 | Monchalin et al. | 356/502 |
| 2004/0071383 A1 | 4/2004 | Balachandran et al. | 385/12 |
| 2010/0128278 A1 * | 5/2010 | Deck et al. | 356/477 |
| 2010/0210950 A1 * | 8/2010 | Dunbar et al. | 600/459 |

FOREIGN PATENT DOCUMENTS

| | | |
|---|---|---|
| DE | 33 34 112 A1 | 3/1984 |
| DE | 39 32 711 A1 | 4/1991 |
| DE | 103 35 988 A1 | 6/2004 |
| DE | 103 59 663 A1 | 7/2005 |
| DE | 10 2004 052 205 A1 | 5/2006 |
| EP | 1 152 240 A2 | 7/2001 |
| EP | 1 158 283 A1 | 11/2001 |
| EP | 1 348 980 A2 | 1/2003 |
| GB | 2 127 544 A | 4/1984 |

OTHER PUBLICATIONS

Mehta, Dalip Singh, Saito, Shohei, Hinosugi, Hideki, Takeda, Mitsuo, Kurokawa, Takashi, Spectral Interference Mirau Microscope With an Acousto-Optic Tunable Filter for Three-Dimensional Surface Profilometry, Applied Optics, Mar. 2003, pp. 1296-1305, vol. 42, No. 7.

* cited by examiner

Fig. 1

ULTRASONIC PROBE AND METHOD FOR THE OPTICAL DETECTION OF ULTRASONIC WAVES

BACKGROUND

Ultrasonic systems usually consist of a sound head that sends signals into the body and receives the echoes as well as a system that processes the received echoes into images. A sound head usually contains a matrix of ultrasonic signal transmitters that transmit the ultrasonic energy pulses into the body region to be investigated and receives reflected ultrasonic energy pulses from the region to be investigated. The signal transmitters (comparable to microphones) convert the received ultrasonic energy pulses into weak electric signals which pass over a cable into the processing unit. The incoming signals of the individual signal transmitters are combined by so-called beam forming. The processing unit generates an image of the body region investigated by means of signal and image processing operations. Matrices are used for dynamic focusing for the image construction and to improve the signal-to-noise ratio. The latter is a very important factor in the design of the overall system.

Conventional ultrasonic heads consist of matrices of piezoelectric signal transmitters which are connected by high-quality micro-coaxial cables to the processing unit. To obtain a high-quality image, a multitude of signal transmitters are needed. A higher number of signal transmitters also means that the complexity of the ultrasonic head is dramatically increased for the following reasons:

The acoustic impedance (characteristic wave impedance) of the piezoelectric signal transmitters must be adapted to that of the body tissue. This is accomplished by using various silicone rubber layers, the thickness of each amounting to ¼ of the wavelength.

Emitted signals are 100 dB "louder" than the received signals. Accordingly, very wide control ranges are necessary.

Since the interval of time between the transmitted signals and the reflected signals amounts to only a few microseconds, a complex attenuation is required to achieve a high axial resolution, to prevent noise after transmission and to shorten the pulse.

The individual signal transmitters in the matrix must be insulated from one another to prevent both acoustic and electric interference. This is an enormous expense in design and production not only of the signal transmitter matrix but also in the cable and in the interface to the processing unit. Accordingly, only a limited number of signal transmitters can be used, which keeps the image quality at a low level.

The electronic signals generated by the piezoelectric signal transmitters are on the order of magnitude of a few microvolts. Therefore, only extremely high-quality micro-coaxial cables can be used to prevent crosstalk between the channels. Due to the rapid reduction in signal strength, the cables also cannot be very long, which limits their usability in everyday clinical practice.

Although it is true of image quality that more signal transmitters are advantageous, this is not the case with regard to the cost of the system and user convenience, as described above.

The electronics of a conventional ultrasonic system are extremely complex. The systems must meet high requirements with regard to additional control ranges, high-frequency analog signals that must be digitized, and data processing of a few dozen gigabits per second.

All the conventional systems have an analog module which has various channels for the transmission and reception of the signals. Each channel receives an analog signal, processes it and converts it to a digital signal. In the case of transmission, this signal processing takes place in the opposite order. The more channels a system has, the better the resolution, the signal-to-noise ratio and the control range. In the reception mode, noise suppression is very important because the lowest signals are only a few nanovolts strong, which corresponds to the level of the noise. Even with very expensive high-quality components and the newest circuit board designs, the control range of the system is reduced by on the order of magnitude of 20 dB due to noise. This is a very critical order of magnitude, which is very important for low B-mode images and Doppler flow measurements.

High-end systems today use up to 256 channels to solve precisely this problem. The disadvantage of this procedure is an explosion of system costs, power consumption and size. Each channel increases the cost of materials, increases the size of the circuit boards and requires additional power. Furthermore, more channels increase the complexity of the overall electronic system, which drastically increases development costs. There are potential improvements through analog ASICs (Application-Specific Integrated Circuits). Due to the small number of systems sold—approximately 30,000 to 40,000 ultrasonic devices are sold per year throughout the world—this approach is extremely inefficient.

Against this background, the object of the present invention was to provide a method for measuring ultrasonic waves and a corresponding ultrasonic probe which would eliminate the disadvantages known from the state of the art as described above.

SUMMARY

This object is achieved by the ultrasonic probe having at least one membrane that is mechanically sensitive to ultrasonic waves and by vibrating the membrane induces a change in the optical path length of a beam of light aimed at the membrane. In addition, the ultrasonic probe has at least one ultrasonic signal transmitter and several channels, each with one interferometric detection unit for determination of the change in the optical path length.

Thus according to the invention a novel approach for measurement of ultrasonic echoes for image generation by means of a microscopic switch matrix of interferometers is made possible. This implies a completely novel technology on the reception end of the reflected echoes of ultrasonic systems.

The following essential improvements are associated with the inventive ultrasonic probe in comparison with the state of the art:

1) The voltage level of the signal emitted by the optical detector amounts to a few millivolts and not microvolts as in the case of traditional piezoelectric systems. This leads to a significantly better signal-to-noise ratio in the analog module of the processing unit. The loss of 20 dB in the case of the systems known from the state of the art is drastically reduced by the optical method. It is expected that an optical system will need fewer channels for the same image quality in comparison with the conventional design. The higher voltage of the signal requires fewer and much less expensive analog components per channel. All of this means a drastic reduction in cost and improves the price/performance ratio.

2) A piezo-based transmission matrix is also needed in the inventive probe. However, the complexity and cost of the matrix are much lower for the following reasons in comparison with the systems known from the state of the art:

a) The voltage strength to be transmitted is high, so that high-quality coaxial cable is no longer needed.

b) The electronic system required for the transmission mode does not change because the electronic circuit for transmitting is separate from the reception end.

3) The optical switch matrices are simpler, more robust and less expensive to manufacture than piezoelectric matrices. In the case of piezo matrices, the cost of the matrix does not change in a linear ratio with the number of elements but instead increases disproportionately. For the optical switch matrices, the costs of materials and production vary on the same order of magnitude as do those for low-end piezoelectric matrices and are therefore much lower than those for high-end matrices.

4) Since millivolt signals are potentially generated by the optical matrices, requirements of the cables for optical reception of the echoes are much lower than in the case of piezoelectric matrices. The cables may therefore also be much longer, which greatly improves the convenience in use.

5) Optical switch matrices generate less heat than piezoelectric matrices.

6) In contrast with the piezoelectric method, the optical method does not need as many silicone layers to approximate the acoustic impedance of the ultrasonic head to that of the body. The signal loss is reduced accordingly.

7) The optical switch matrix can work with any ultrasonic frequency, which is not the case with piezoelectric matrices because they have a central resonance frequency. The membrane could very easily be tuned to a certain frequency, but this fact nevertheless yields potential for considerable cost savings in production of the optical switch matrix.

With regard to light sources, there are different variants for integrating them into the probe or using an external light source. According to a first preferred variant, the probe has optical fibers and/or beam splitters as well as a light source to divide the light coming from the light source into multiple beams of light and to input these beams of light into the individual channels. According to a second preferred variant, a light source is integrated into each channel and/or a light source is assigned to each channel. According to a third variant, the probe has optical fibers and/or beam splitters such that an external light source is used and the light of this external light source is divided into multiple beams of light which are directed into the individual channels.

With regard to the type of light source, there are fundamentally no restrictions. Thus spot light sources, in particular lasers, can be used as readily as incoherent light sources. In the case of incoherent light sources, then at least one lens is additionally used to focus the incoherent light on the membrane. This may also be advantageous in the case of laser light sources.

Preferably at least one photodetector is assigned to each optical channel of the inventive ultrasonic probe or such a detector is directly integrated into the respective optical channels. The photodetector here is especially preferably a photodiode.

With the choice of membrane, it is preferable to use a material that has a comparable impedance for the ultrasonic wave in comparison with the object or body to be investigated. Preferred materials here include for example polymers such as PVDF or silicones. Likewise, however, it is also possible for the membrane to be made of a transparent piezoactive material so that in addition to the optical function in detection, the membrane can be used simultaneously as an ultrasonic signal transmitter. The membrane preferably has regions assigned to the individual channels which essentially prevent crosstalk with the other channels.

A transparent panel is preferably connected to the membrane on the side facing the light source. The thickness d of the transparent panel represents the optical path length of the beam of light up to the membrane. According to a preferred embodiment of the ultrasonic probe, the transparent panel with the thickness d/2 has a semitransparent layer on which a portion of the incident light is reflected while the remainder of the incident light can pass through to the membrane. The reflected portion of light serves here as a reference beam, while the portion of light that passes through represents the measurement beam. When using materials of different refractive indices, the position of the semitransparent layer may also be at a thickness differing from d/2. It is crucial that the measurement beam and reference beam pass through approximately the same optical path lengths.

The transparent panel preferably has mirrorization in some areas on the surface facing away from the membrane to reflect the reference beam. The transparent panel is preferably made of glass, crystal and/or a transparent polymer material.

The membrane preferably has mirrorization in at least some areas on the surface facing away from the transparent panel to reflect the measurement beam, i.e., the portion of the incident light passing through the membrane.

According to a further preferred variant at least one additional layer for adapting the impedance between the ultrasonic waves and the membrane is applied in at least some areas to the side of the mirrorization facing away from the membrane. This allows an adaptation of the impedance for the ultrasound between the body to be investigated, from which the ultrasonic signal originates, and the membrane. It is therefore possible to prevent a portion of the ultrasonic signal from penetrating into the membrane layer and thus being optically effective.

According to another preferred variant, at least one layer of a piezoactive material which serves as ultrasonic transmitter is applied to the side of the mirrorization which faces away from the membrane.

The arrangement of the individual optical channels in the ultrasonic probe may be any arrangement but arrangements in lines and/or arrays are preferred.

The inventive ultrasonic probe can preferably be connected to an analyzer unit and/or an image processing unit.

According to the invention, a method for optical detection of ultrasonic waves by means of an ultrasonic probe is also made available, in which ultrasonic waves transmitted by an ultrasonic signal transmitter are reflected on an object or body and the reflected ultrasonic waves are registered by multiple optical detection units in that a membrane, which is integrated into the ultrasonic probe and is in contact with the object or body, is excited to vibration by the reflected ultrasonic waves. The optical path length of at least one beam of light focused on the membrane is altered by this vibration, such that the modification of the optical path length can be determined interferometrically.

The inventive method is based on the fact that each interferometer assigned to the individual channel of the ultrasonic probe replaces the reception function of the piezoelectric element of the matrix of the ultrasonic head which is known from the state of the art. Light is focused on a membrane which is placed on the skin in the position of the interferometer. The vibration of the membrane in this position caused by the amplitude of the ultrasonic echo is converted into a variation in the light intensity by means of the interference principle. The variation in the light intensity is converted into an electronic signal by a photodetector. A novel, greatly simplified data acquisition system converts the analog signals into digital signals. This process is performed for each individual element of the optical switch matrix in parallel. The digital signal is then converted into an image in the processing unit in the traditional manner.

The change in light intensity is preferably converted to an electronic signal by a photodetector. This analog signal may preferably be converted into digital signals with the help of an AD converter. This process preferably takes place in parallel for each individual channel of the ultrasonic probe. The digital signal is then converted into an image by an image processing unit in the traditional manner.

According to the invention, it is also preferable to integrate the optical switch matrix into a single fixed glass panel. In this way the system is very robust with respect to environmental influences.

BRIEF DESCRIPTION OF THE DRAWINGS

The inventive method and the inventive ultrasonic probe will be explained in greater detail on the basis of the following figures without attempting to restrict them to the specific embodiments described here.

DESCRIPTION OF ILLUSTRATIVE EMBODIMENTS

Figure 1:
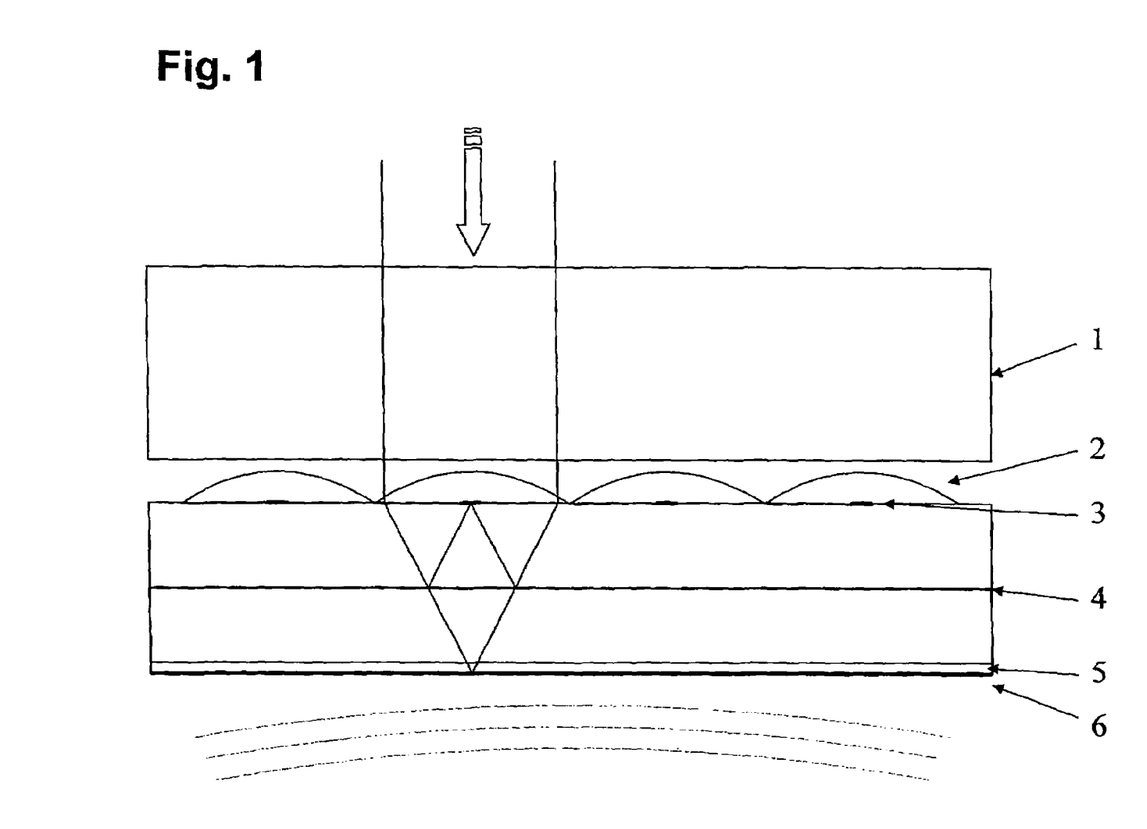
FIG. 1 shows a frontal view of the optical path of an inventive ultrasonic probe.
Figure 2:
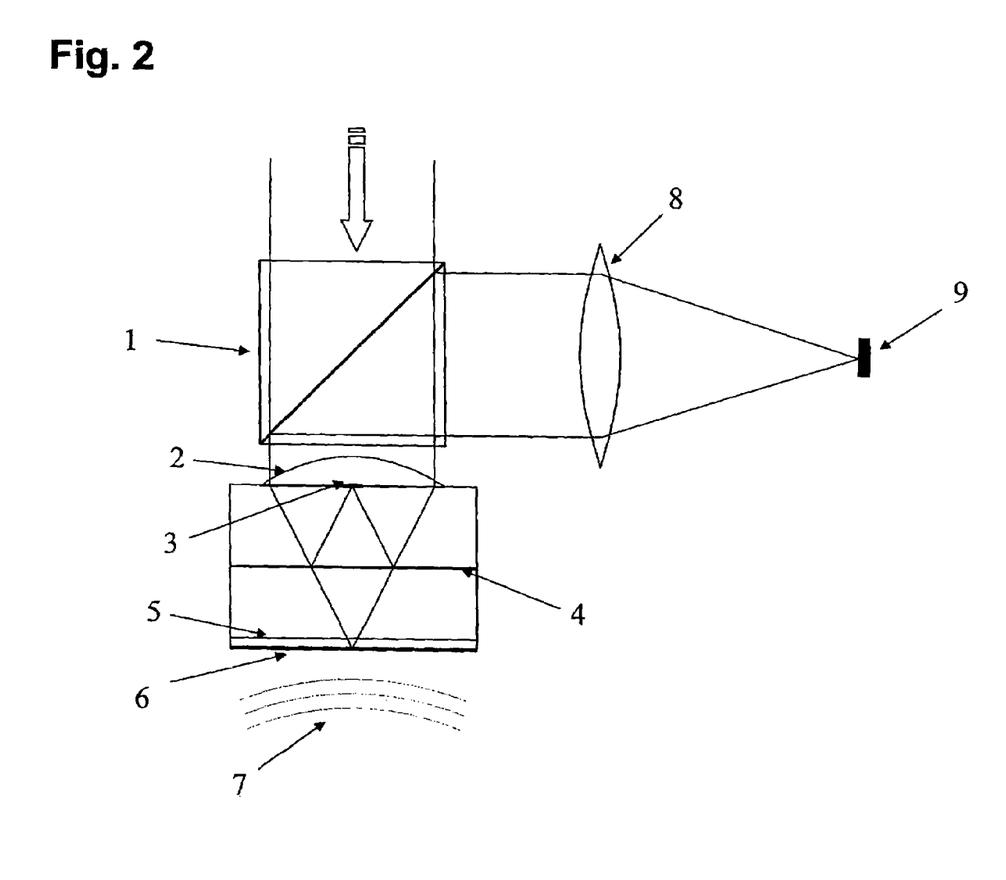
FIG. 2 shows a side view of the optical path of an inventive ultrasonic probe.

FIGS. 1 and 2 show the collimated light coming from the light source strikes a first beam splitter 1, which it first passes through. The light is focused on the back side by the lenses 2 of the array that are on the front side of a glass panel. The membrane 5, which is sensitive to ultrasonic waves 7 has a mirrorization 6 on the outside thereof. Some of the light is deflected on a partially reflecting layer 4 and focused on the reference surface 3 which is in the arrangement shown here between the lens and the glass panel. The reference surface 3 is reflective and can be structured laterally to implement different phase shifts in the reference beam. The light reflected on the mirrorization 6 and the reference surface 3 is superimposed again on the beam splitter layer 4 and passes through the lenses 2 of the array in the opposite direction for illumination, by which it is collimated again. This light then enters the beam splitter 1, is separated by it from the illumination beam and focused by the lens 8 on the detector 9. The lens 8 and the detector 9 are also arranged in an array where a lens 8 and a detector 9 are assigned to each detection channel (each lens 2).

The lens 2, partially reflected layer 4, membrane 5, mirrorization 6 and reference surface 3 are preferably combined with the glass panel as a compact component which functions as a carrier at the same time. This eliminates complex adjustment, and getting out of adjustment due to environmental influences can be minimized. To eliminate the splitting of the light twice in the beam splitter 1 and on the layer 4, the lens 2, the membrane 5 with mirrorization 6 and the reference surface 3 may also be applied to the side faces of the beam splitter 1. The beam splitting on layer 4 may therefore be omitted, thereby increasing the light efficiency.

Figure 3:
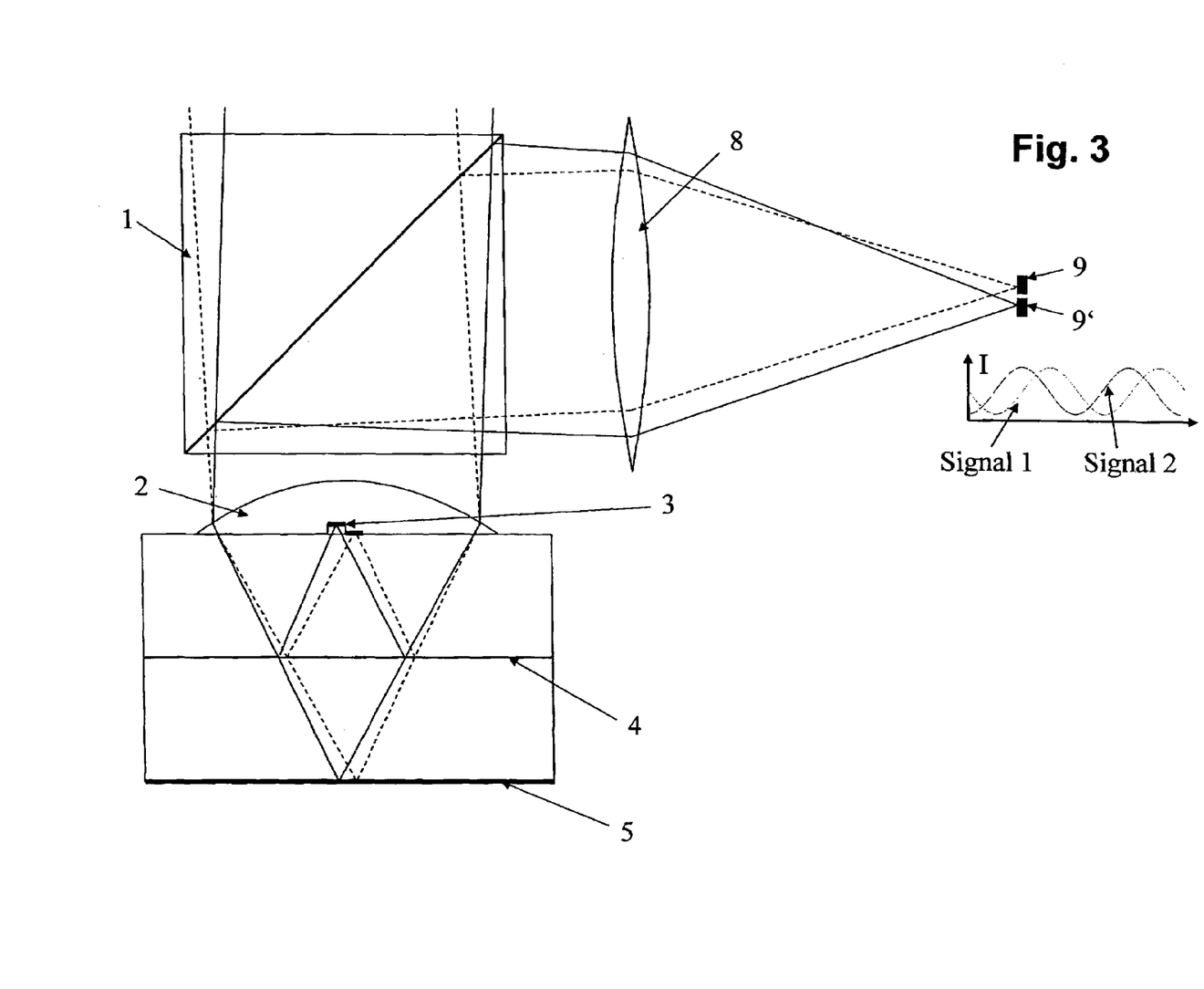
FIG. 3 shows the production of phase-shifted signals on the basis of a schematic diagram.

FIG. 3 shows a first inventive variant for generating signals with a phase shift of 90°. With regard to the importance of the reference numerals, reference is made to FIG. 2, unless otherwise indicated.

If the interferometer is illuminated in a slightly divergent manner, e.g., by not using a laser as the light source but instead using a planar source, the result is an extensive image of this light source on the membrane mirror as well as on the reference surface. If the reference surface is designed so that a height step of $h=\lambda/(8n)$ is introduced within the surface of the source image, then a phase that is different by $\lambda/4$ is impressed on the light as a function of the point of impact on the step (at the right or left next to the jump in height 3), where $\lambda$ denotes the illumination wavelength and n is the refractive index of the glass material in which the height step is designed. Since the membrane is planar and does not have any corresponding height step, with coherent superpositioning of the light reflected there with the light reflected on the stepped reference surface, interference signals with a 90° phase shift are generated. These may be measured by imaging the height step on a two-part detector. The right and left parts of the height step are thus analyzed on separate detector surfaces (detector 9 and 9').

Figure 4:
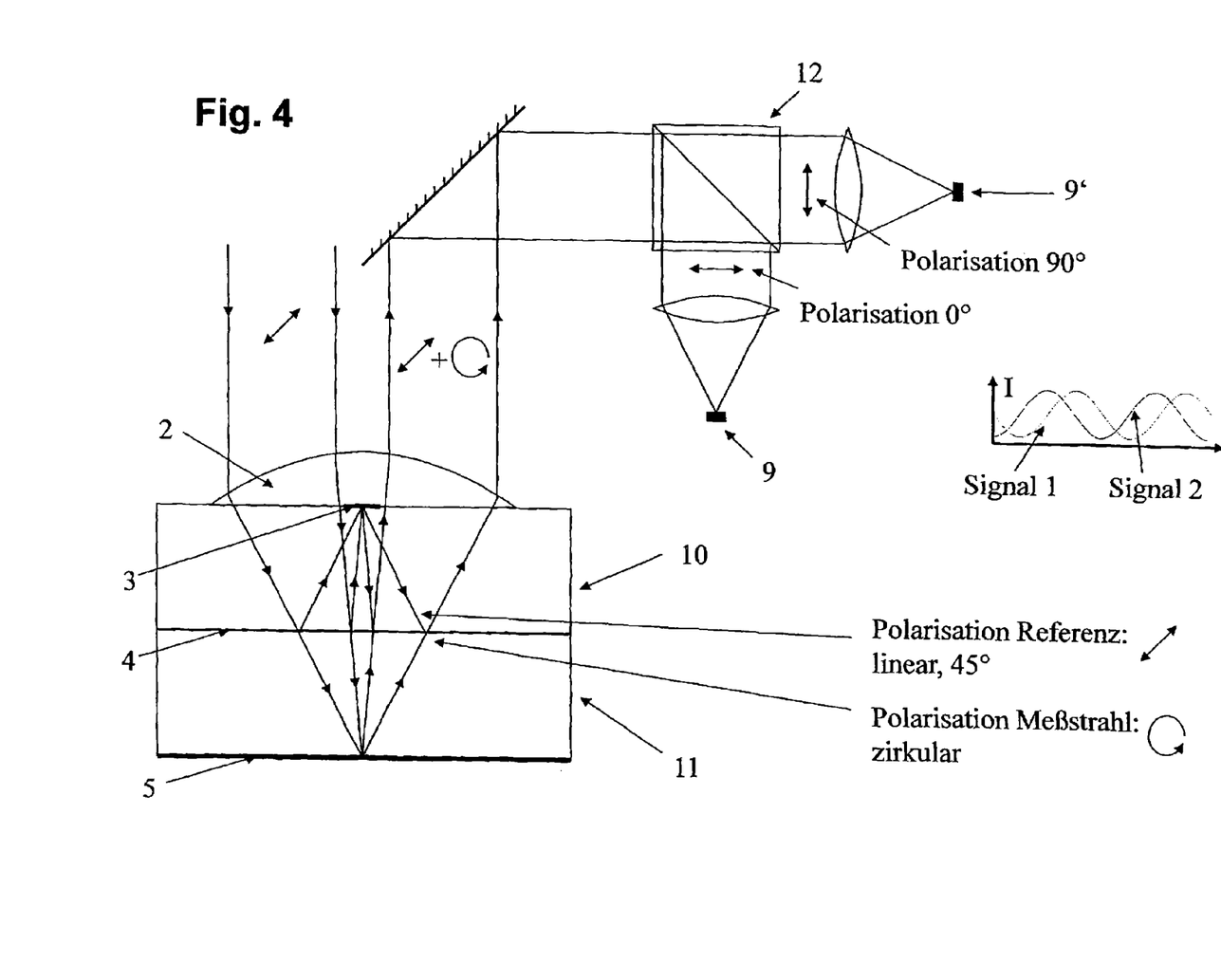
FIG. 4 shows a second variant for the production of phase-shifted signals on the basis of a schematic diagram.

FIG. 4 shows a second inventive variant for generating signals with a 90° phase shift. Here again, reference is made to FIG. 2 with respect to the meaning of the reference numerals.

For this variant of generating two interferometer signals with a 90° phase shift, the interferometer is illuminated with polarized light, e.g., with linear polarization at a 45° orientation to the x axis of the beam coordinate system. With this variant, a polarizing beam splitter cube cannot be used for separating the illumination beam and the reflected beam, so asymmetrical illumination can be used as illustrated in FIG. 4. Otherwise, losses of efficiency must be expected. The reference beam passes only through the upper glass panel 10 of the interferometer and thus does not change its linear polarization direction from 45° orientation. After the beam splitter layer, the measurement beam passes through the lower panel which is designed as a birefringent $\lambda/8$ panel 11. This means that a delay of $\lambda/8$ with simple passage through the panel and $\lambda/4$ with double passage is created between the x and y components of the electromagnetic field. At the site of recombination with the reference beam, the measurement beam is thus circularly polarized, i.e., a 90° phase shift was inserted between the x and y components.

If the x and y components of polarization are separated for the recombined beam, e.g., with the help of a polarizing beam splitter cube 12 and if the two components strike separate detectors 9 and 9', then two different interference signals with a 90° phase shift are measured on the detectors.

It is advantageous in comparison with the variant described in a) that the two detectors can be positioned more independently of one another and need not be arranged closely side by side.

Figure 5:
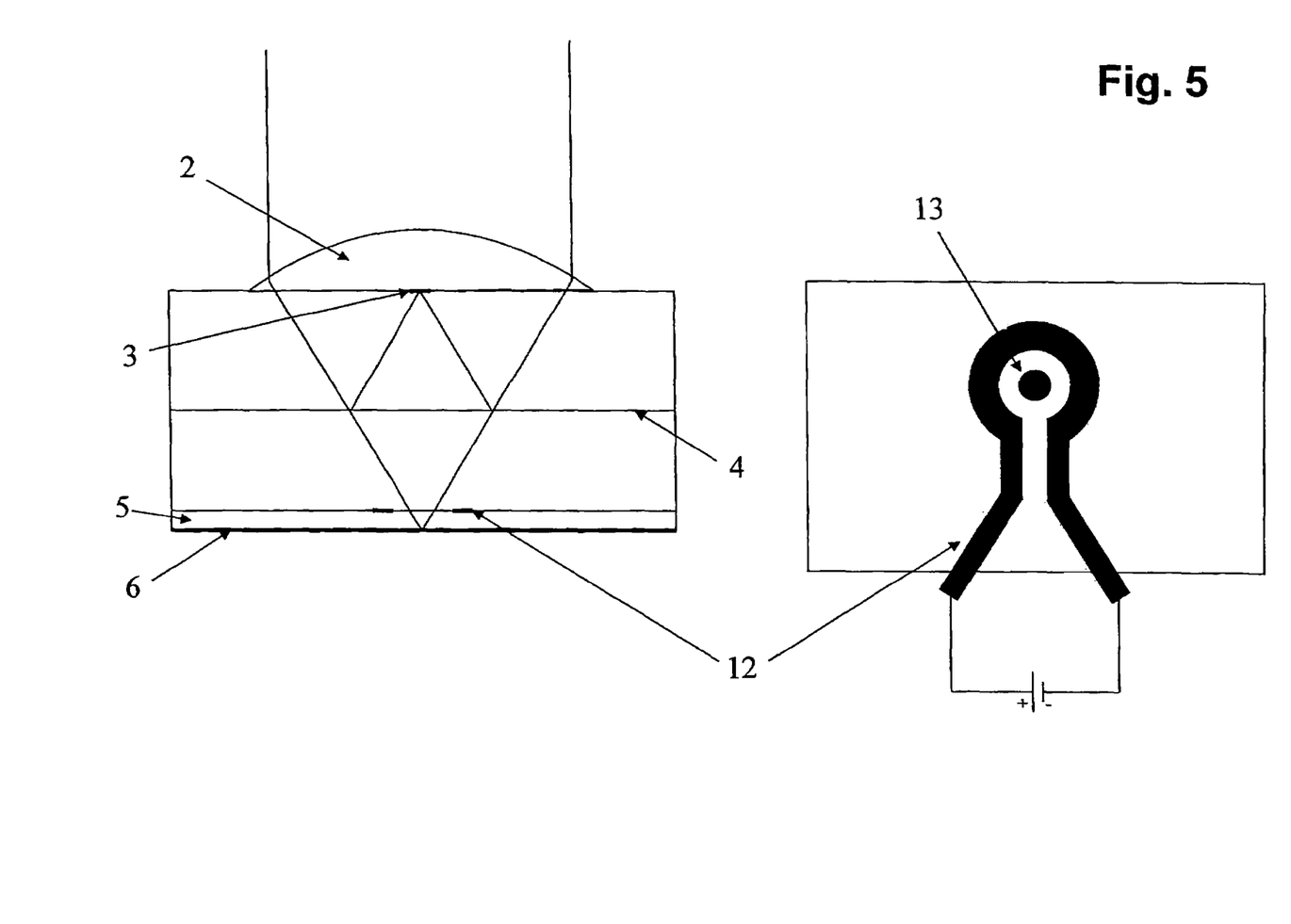
FIG. 5 shows a method for optimizing the interferometer signal on the basis of a schematic diagram.

FIG. 5 shows another inventive variant for optimization of the interferometer signal in the side view (FIG. 5a) and in the view from above (FIG. 5b). With regard to the meaning of the reference numerals, reference is made to FIG. 2 unless otherwise indicated.

Since the deflection of the membrane 6 is only in the range of a few nanometers due to the ultrasonic influence, it may happen that with an unfavorable coordination of the lengths of the reference beam path and the measurement beam path, the modulation is only at a maximum or a minimum of the sinusoidal interferometer curve. In this case the resulting electric detector signal is not measurable. The monolithic design of the interferometer leads to the stability which is an absolute requirement for the measurement, but it also prevents mechanical tuning of the reference and measurement beam paths with regard to the maximum detector signal at low membrane deflections. This is achieved only when the two beam paths have an average path difference of $\lambda/4$ because in this case the average intensity of the interference signal on the detector is on the flank of the sinusoidal signal characteristic of the two-beam interference.

FIG. 5 diagrams one option for implementing the optical paths despite the monolithic design of the interferometer. A metallic conductor loop 12 is structured here between the membrane layer 5 and the glass carrier. This may be accomplished for example with typical microstructuring processes, whereby the glass carrier serves as a substrate on which a metal layer is applied which is then structured in the form of the conductor loop.

The focus point of the measurement beam 13 on the membrane is positioned so that it is at the center of the conductor loop. If a current flows through the conductor loop during operation of the measurement system, then its temperature and also the temperature of the ambient medium change as a function of the amperage due to ohmic losses. Thermal expansion of the membrane and glass block as well as the temperature-induced change in refractive index lead to a change in the optical path for the measurement beam. In this way the ratio of the path lengths of the measurement beam and the reference beam can be adapted within certain limits via the current flow through the conductor loop and the interferometer can be tuned to an optimal signal level in the ultrasonic detection.

The invention claimed is:

1. An ultrasonic probe for optical detection of ultrasonic waves reflected from an object or body, comprising at least one membrane that is exposed to a source of light and is mechanically sensitive to ultrasonic waves inducing a modification of the optical path length of the light due to vibration of the membrane by at least one ultrasonic signal transmitter, multiple channels each with one interferometric detection unit configured to determine the change in the optical path length according to the Mirau method, at least one lens for focusing the light on the membrane, and a transparent panel connected to the at least one membrane, the panel having a thickness d determining the optical path length of the light approaching the membrane.

2. Ultrasonic probe according to claim 1, wherein the probe has a light source and means to divide the light coming from the light source into multiple beams of light and to direct the light beams into the channels.

3. Ultrasonic probe according to claim 1, wherein the light source comprises multiple light sources, one light source being integrated into or assigned to each channel.

4. Ultrasonic probe according to claim 1, wherein the probe has means to divide the light of an external light source into multiple beams of light and direct the light beams into the channels.

5. Ultrasonic probe according to any of claims 2, 3, or 4, wherein the means to divide the light comprises at least one beam splitter.

6. Ultrasonic probe according to any of claims 2, 3, or 4, wherein the light source is a laser.

7. Ultrasonic probe according to any of claims 2, 3, or 4, wherein the light source is an incoherent light source, and wherein the at least one lens focuses the incoherent light on the membrane.

8. Ultrasonic probe according to claim 1, wherein at least one photodetector is integrated into or assigned to each channel.

9. Ultrasonic probe according to claim 8, wherein the photodetector is a photodiode.

10. Ultrasonic probe according to claim 1, wherein the membrane is made of a material having a modulus of elasticity comparable to the material of the object or the body.

11. Ultrasonic probe according to claims 1 or 10, wherein the membrane consists of a polymer material selected from polyvinylidine fluoride and silicone.

12. Ultrasonic probe according to claim 1 or 10, wherein the membrane comprises a transparent piezoactive material.

13. Ultrasonic probe according to claim 1, wherein the membrane has areas assigned to the individual channels which essentially prevent crosstalk with the other channels.

14. Ultrasonic probe according to claim 1, wherein the membrane has mirrorization in at least some areas on a surface facing away from the transparent panel to reflect internally the light.

15. Ultrasonic probe according to claim 14, wherein at least in some areas at least one additional layer is applied to the side of the mirrorization facing away from the membrane for adjusting the impedance between the ultrasonic waves and the membrane.

16. Ultrasonic probe according to claim 15, further comprising at least one layer of a piezoactive material on the side of the mirrorization facing away from the membrane which serves as an ultrasonic signal transmitter.

17. Ultrasonic probe according to claim 16, wherein the transparent panel has a semitransparent layer of the thickness d/2 in the center of the panel from which a first portion of the incident light is reflected while a second portion of the incident light passes through to the membrane.

18. Ultrasonic probe according to claim 17, further comprising additional mirrorization in some areas on the surface of the transparent panel facing away from the membrane for internal reflection of some of the incident light.

19. Ultrasonic probe according to claim 18, wherein the additional mirrorization has a height step of approximately $h=\lambda/8n$, where n=refractive index of the transparent panel, so that a phase shift of approximately 90° of the light reflected from the additional mirrorization can be generated with coherent superpositioning.

20. Ultrasonic probe according to claim 1, wherein the light source emits polarized light and the transparent panel consists of an upper panel and a lower panel, whereby the lower panel is a birefringent $\lambda/8$ panel for generating circularly polarized light.

21. Ultrasonic probe according to claim 1, wherein at least one metallic conductor loop is arranged between the membrane and the transparent panel whereby a focus point of the light passing through said at least one lens is at the center of the conductor loop.

22. Ultrasonic probe according to claim 1, wherein the transparent panel is made of glass, crystal and/or a polymer material.

23. Ultrasonic probe according to claim 1, wherein the channels are arranged in rows.

24. Ultrasonic probe according to claim 1, wherein the channels are arranged in arrays.

25. Ultrasonic probe according to claim 1, further comprising means for coupling the probe to an analyzer unit.

26. Ultrasonic probe according to claim 1, further comprising means for coupling the probe to an image processing unit.

27. A method for optical detection of ultrasonic waves by means of an ultrasonic probe with which ultrasonic waves transmitted by an ultrasonic signal transmitter are reflected from an object or body and the reflected ultrasonic waves are registered by multiple optical detector units, the method comprising: integrating a membrane into the ultrasonic probe, providing a transparent panel in the optical path and connecting the panel to the membrane, contacting the object or body with the ultrasonic probe so that the membrane is excited to vibration by the reflected ultrasonic waves, and so that the optical path length of at least one beam of light directed in a spot at the membrane is altered, and determining this change in the optical path length interferometrically according to the Mirau method.

28. Method according to claim 27, further comprising: originating the at least one beam of light from at least one spot light source, in particular a laser.

29. Method according to claim 27, further comprising: focusing the light on the membrane by means of lenses.

30. Method according to any of claims 28, 29, further comprising:
converting any change in the light intensity into an analog signal by a photodetector.

31. Method according to claim 30, further comprising: converting the analog signals to digital signals by means of AD converters.

32. Method according to claim 30, further comprising: comparing the light intensity of a beam of light coming from the membrane with a beam of light not directed at the membrane.

33. Method according to claim 30, further comprising: comparing the light intensity of a beam of light coming from the membrane with two or more reference beams of light not directed at the membrane, the phases of the reference beams being shifted by a selected angle related to the difference in the optical path length of the reference beams.

34. Method according to claim 30, further comprising: providing a transparent panel in the optical path of said at least one beam of light, the transparent panel including a height step of approximately $h=\lambda/8n$ where n=refractive index of the transparent panel, and comparing the light intensity of a beam of light coming from the membrane with two or more reference beams of light not directed at the membrane by coherent superpositioning, at least one of the reference beams being reflected from the height step.

35. Method according to claim 30, further comprising: providing a transparent panel in the optical path of said at least one beam of light which is linearly polarized, the transparent panel including an upper panel and a lower birefringent $\lambda/8$ panel adjacent to the membrane, and comparing the light intensity of a beam of light coming from the membrane combined with two or more reference beams of light not directed at the membrane.

36. Method according to claim 35, wherein the comparing step is performed by separating x and y components of the combined beams by a polarization splitter and detecting the x and y components by two separate detectors.

37. Method according claim 30, further comprising: providing a transparent panel in the optical path of said at least one beam of light, providing a conductor loop arranged between the membrane and the transparent panel, and adjusting the current in the conductor loop to adjust the optical path length of the at least one beam.

* * * * *